United States Patent [19]

Cain

[11] 3,966,668

[45] June 29, 1976

[54] CARBON BLACK DISPERSIONS AND METHOD OF MAKING SAME
[75] Inventor: Alfred R. Cain, Akron, Ohio
[73] Assignee: The Firestone Tire & Rubber Company, Akron, Ohio
[22] Filed: Dec. 11, 1974
[21] Appl. No.: 531,574

Related U.S. Application Data
[63] Continuation-in-part of Ser. No. 447,321, March 1, 1974, abandoned, which is a continuation of Ser. No. 385,525, Aug. 3, 1973, abandoned, which is a continuation of Ser. No. 268,242, July 3, 1972, abandoned.

[52] U.S. Cl.......................... 260/37 N; 260/77.5 AP
[51] Int. Cl.$^2$.................... C08L 75/06; C08L 75/08
[58] Field of Search................................. 260/37 N

[56] References Cited
UNITED STATES PATENTS
3,061,574  10/1962  Smith............................... 260/37 N
3,512,183  5/1970   Sharp............................... 260/37 N
3,523,103  8/1970   Zemlin............................. 260/37 N OTHER PUBLICATIONS
Kraus—Reinforcement of Elastomers, (Wiley) (N.Y.) (1965), pp. 324–330.

Kirk–Othmer—Encyclopedia of Chem. Techn. (2nd Ed., vol. 4) (1964) (Interscience) (N.Y.), pp. 244–247, 255, 265, 267 & 278–280.

Primary Examiner—Donald E. Czaja
Assistant Examiner—H. H. Fletcher

[57] ABSTRACT

Porous-type carbon blacks are incorporated into flowable polyurethane polymer precursors, in amounts of 5 to 40%, based on the weight of the precursors. The mixtures, which are initially extremely viscous, are then subjected to vacuum, which treatment causes a marked decrease in the viscosity of the mixtures, so that, notwithstanding the presence of the carbon blacks, the mixtures remain sufficiently flowable for casting and other forming operations requiring ready flowability. The cured materials formed from the precursors are elastomers having physical properties reflecting a high degree of reinforcement by the carbon black.

4 Claims, 10 Drawing Figures

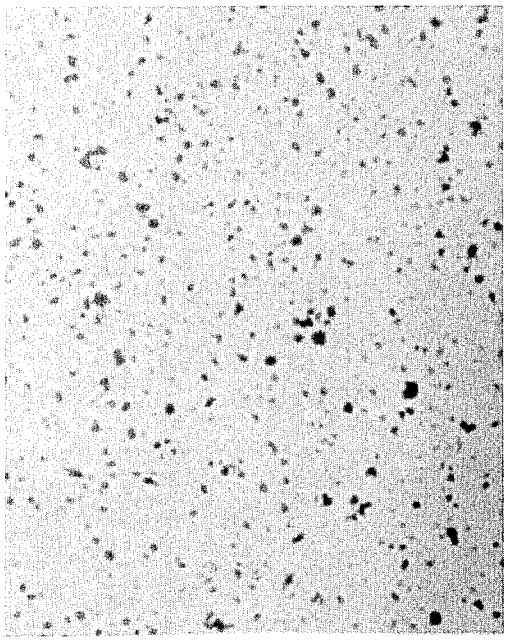
Figure 1 - Regal 400 R
MILLED ONLY
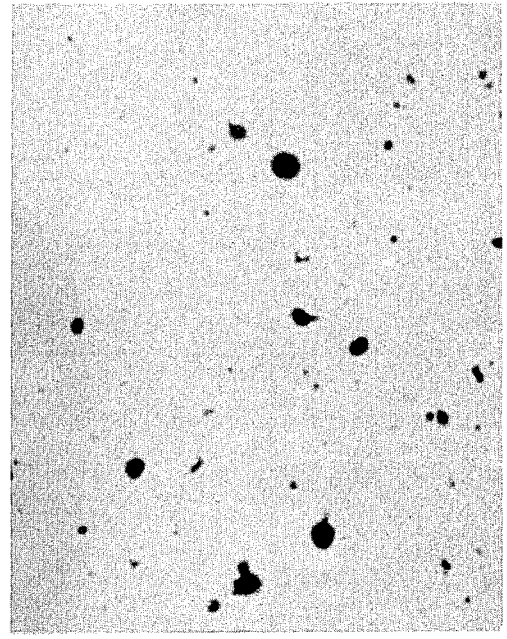
Figure 1a - Regal 400 R
VACUUM TREATED
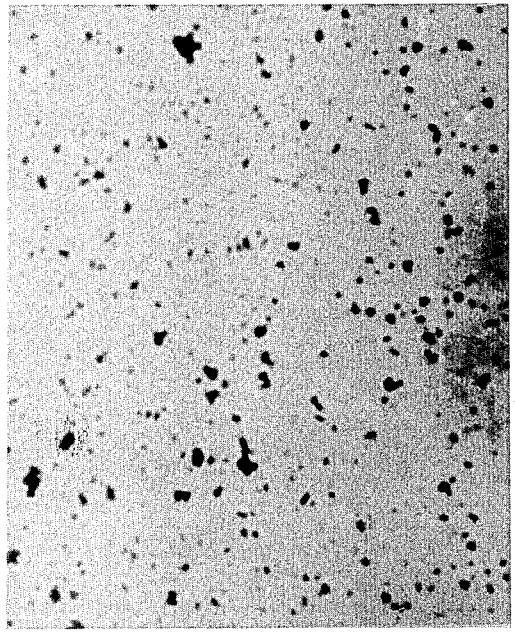
Figure 2 - Regal 330 R
MILLED ONLY
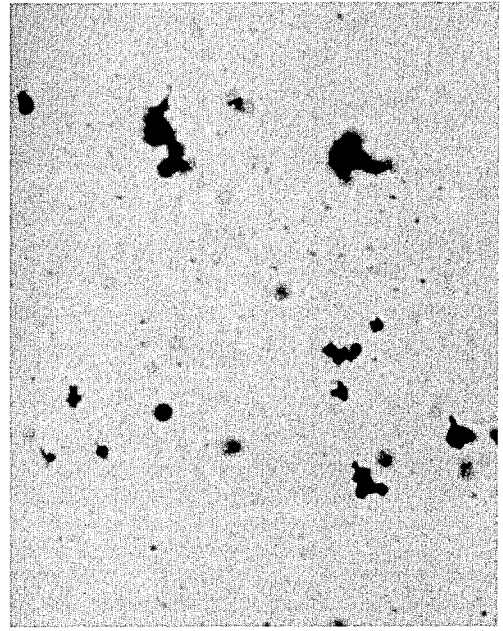
Figure 2a - Regal 330 R
VACUUM TREATED

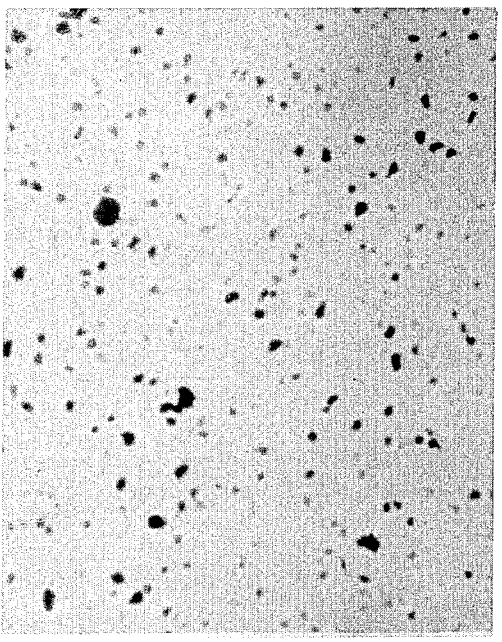
Figure 3 - Mogul L
MILLED ONLY
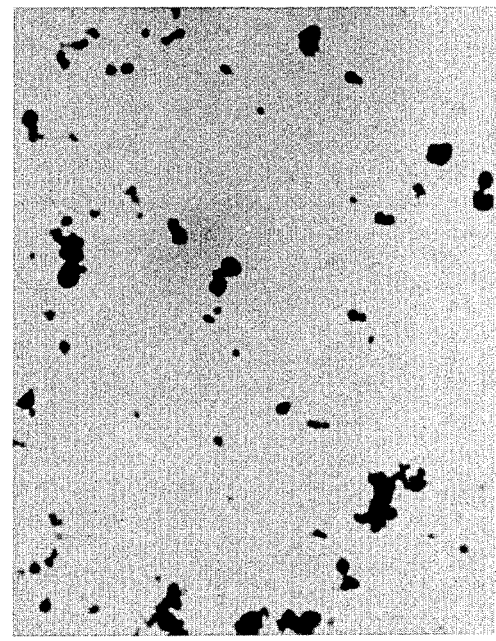
Figure 3a - Mogul L
VACUUM TREATED
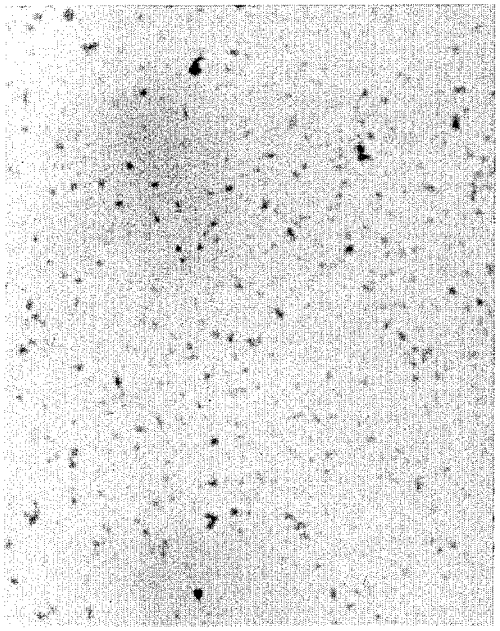
Figure 4 - Vulcan SC
MILLED ONLY
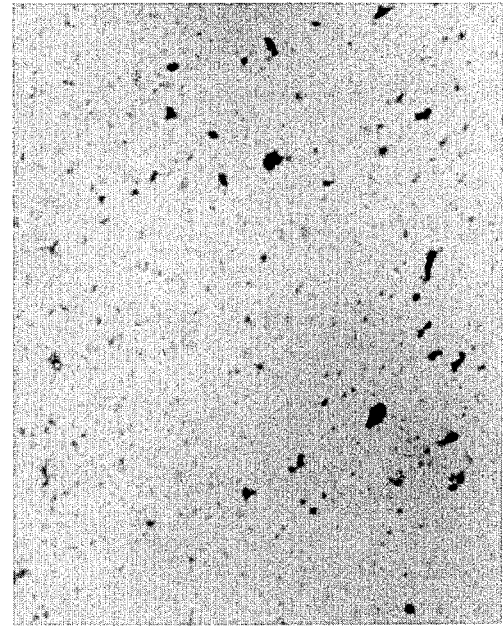
Figure 4a - Vulcan SC
VACUUM TREATED

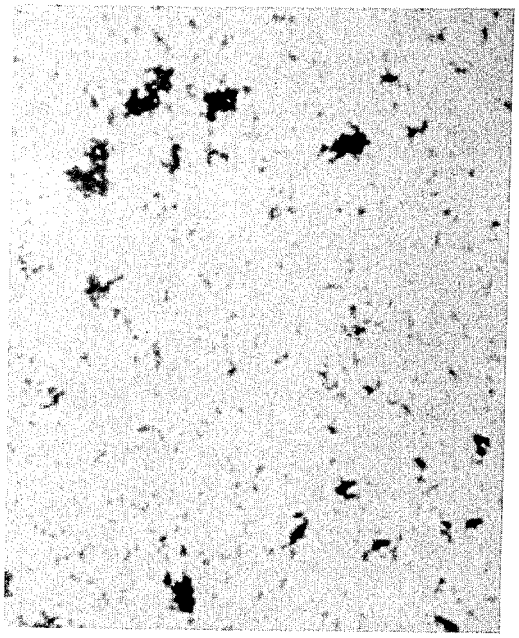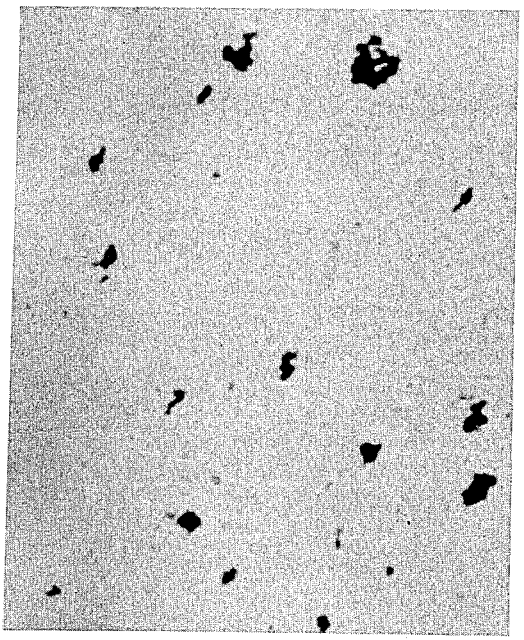
Figure 5 – Shawinigan, Acetylene Black
MILLED ONLY
Figure 5a – Shawinigan, Acetylene Black
VACUUM TREATED

CARBON BLACK DISPERSIONS AND METHOD OF MAKING SAME

RELATED CASES

This application is a continuation-in-part of Cain application Ser. No. 447,321, filed Mar. 1, 1974 (now abandoned), said application Ser. No. 447,321 being a continuation of Cain application Ser. No. 385,525 filed Aug. 3, 1973 (now abandoned) which in turn is a continuation of Cain application Ser. No. 268,242 filed July 3, 1972 (now abandoned).

BACKGROUND OF THE INVENTION

The Prior Art

Carbon blacks have heretofore been incorporated into millable (as distinguished from flowable precursors) polyurethane rubbers, and have been found to reinforce them to a degree. However, when the types of carbon black ordinarily used for the generality of rubbers are incorporated in any substantial amounts into low-molecular-weight flowable and castable polyurethane rubber precursors, and also when porous carbon blacks are so incorporated without subjecting the mixture to vacuum treatment as disclosed hereinbelow, the flowability is greatly impaired, and the physical properties of the final cured rubber products are very little, if at all improved, see Axelwood et al., Rubber Age, 96 (2) 2233 (1964). In fact, if a sufficient quantity of carbon black is added to significantly affect the properties of the cured rubber products, the precursors become so viscous that they cannot, as a practical matter, be formed by casting, flowing, foaming, injection or any other procedure dependent upon flowability.

Objects of the Invention

Accordingly, it is an object of this invention to provide cast polyurethane rubbers having reinforcement-enhanced properties, particularly enhanced properties at high temperature, such as tensile strength, modulus, tear strength, rebound and the like.

Another object is to provide precursors for such improved cast polyurethane rubbers, which precursors are readily flowable and amenable to casting, flowing, injection, foaming and other similar forming operations.

A still further object is to achieve the above objects by the use of readily and inexpensively available carbon blacks as reinforcing agents.

SUMMARY OF THE INVENTION

Synopsis of the Invention

The above and other objects are secured, in accordance with this invention, by incorporating, into a flowable polyurethane polymer precursor, from 5 to 40%, based upon the weight of the precursors, of a porous-type carbon black. The term "precursor" is used herein to designate any of the constituents entering into the manufacture of polyurethane rubbers at any stage while said constituents are still in a flowable condition. The term "porous carbon black" refers to an industry-recognized class of blacks which can be seen under the scanning electron microscope to have numerous pores, and which commonly exhibit a disparity of particle diameters when measured visually as compared to particle diameters measured by adsorption techniques as discussed more fully hereinbelow. The incorporation of the porous carbon black is accomplished by mixing the carbon black into a precursor while such precursor is in a fluid state. The mixture is then subjected to a vacuum during and/or after the mixing. Volatile matter and/or gases are evolved, and a dramatic decrease in viscosity of the mixture takes place. Optionally a readily volatile solvent is incorporated into the carbon black or into the mixture before the vacuum treatment, and is volatilized with moderate heating if necessary. After the decrease in viscosity has been effected by the vacuum treatment, the mixture is cast, flowed, extruded, injected, foamed, expanded or otherwise formed into its desired final shape, and then cured. Notwithstanding the presence of the carbon black, the mixture is quite readily flowable and amenable to manipulations requiring flowability, such as the aforesaid forming operations. This appears to be attributable to the concurrence of the use of the porous (as distinguished from non-porous) carbon black and to the vacuum treatment.

THE DRAWINGS

The invention is illustrated by the accompanying drawings, which are reproduced from photomicrographs of blends of various carbon blacks with a polyurethane precursor taken before and after the vacuum treatment. The magnification in 630X corresponding to a scale of 1.0mm = 1.5 microns.

PREFERRED EMBODIMENTS OF THE INVENTION

The Porous-type Carbon Black

Certain types of oxidized furnace carbon blacks commonly used as darkening pigments in inks, etc., are considered in the art to be "porous". A general discussion of the quality of "porosity" is given in the article on "Carbon Black" in the Encyclopedia of Chemical Technology, Interscience, New York, 2d Edition, Vol. 4 (1964), pp. 246 and 247. See also G. Marsh, "American Ink Maker", October 1966, the article, "Properties and Performance in Inks of the New Furnace Blacks". In general it is observed that the particles of certain carbon blacks will show a substantially greater surface area, as determined by nitrogen absorption, than the area calculated from the gross dimensions of the particles as observed microscopically. If it is found that the ratio of the average particle diameters, as back-calculated from the area as determined by nitrogen absorption, to the arithmetical average diameters as observed microscopically, is at least about 1.2, then the carbon black will be found to be sufficiently porous for use in this invention. There is no critical upper limitation on this ratio, and carbon blacks are available in which this ratio is as high as 2.5. Porous carbon blacks are also characterized by being "oxidized", i.e., the carbon black particles have incorporated substantial quantities of oxygen. Such carbon blacks may be made from originally-less-porous carbon blacks by heating at high temperatures in oxygen-containing atmospheres, or by treatment with various acid such as nitric acid. It appears that the oxygen selectively etches holes into the carbon black particles, along crystalline and chemical discontinuities, thereby producing the effect of porosity. It also appears that, besides the geometrical alteration of the carbon black particles by the oxygen treatment, there also occurs certain oxidative chemical changes on the surface of the particles which are essential to the operability of the carbon black in this invention. The antecedent carbon blacks from which the porous carbon blacks are made are not critical in the context of the present invention; they may have been furnace blacks, channel blacks, lampblacks, thermal blacks, acetylene blacks, or blacks derived from char in the destructive distillation of scrap rubber and the like. Also the carbon blacks may be such that they were generated under oxygenating conditions such as to impart a porous and oxidized character to the carbon black. As to surface chemistry, the blacks may be of neutral, alkaline or acid character. The arithmetical average particle size of the porous carbon blacks used in this invention should be in the range of 20–300 millimicrons.

No fundamental theoretical reason has been found for the special behavior of the porous carbon blacks in the practice of this invention. However, one incidental phenomenon has been observed in connection with the experiments underlying the invention, namely, that the porous carbon blacks appear to increase in diameter after the vacuum treatment as compared to their diameter before the vacuum treatment. This phenomenon is not observed in experiments where non-porous carbon blacks are subjected to the prolonged vacuum treatment which is one essential element of the present invention. This will be seen from the photographs in the drawings, which are photomicrographs of samples of carbon black-containing compositions prepared as described hereinafter in Example VI. It will be seen from figures that the porous carbon blacks (Regal 400 R, Regal 330 R, and Mogul L) all show a large increase in particle size in the case of the milled and vacuum treated samples, (FIGS. 1a, 2a, and 3a), as compared to corresponding samples which were milled only, (FIGS. 1, 2 and 3). This increase in particle size is not observed in the case of the non-porous blacks (Shawinigan, Acetylene Black, and Vulcan SC); thus there is no increase in particle size in FIG. 4a, as compared to FIG. 4, or in FIG. 5a as compared to FIG. 5, etc.

There are also some indications that the oxidation treatment, besides etching holes into the carbon black particles to render them porous, also effects some obscure surface chemical changes so that, to be suitable for use in this invention, a given carbon black must not only exhibit porosity of the degree above specified, but must also have undergone the chemical changes incident to the oxidation treatment i.e., the carbon black must both be porous and also have a history of high temperature oxidative treatment.

The Flowable Polyurethane Casting Composition and the Incorporation of the Porous Carbon Black thereinto These are based upon flowable low molecular weight (say 2000–20,000 molecular weight) precursor polymers (A) having two or more active hydrogen atoms per molecule. These may be, for instance, hydroxy-terminated polyalkylene oxides such as polyproxylene oxide; polyesters such as poly(ethylene glycol adipate) or poly(caprolactone); or hydroxy-terminated hydrocarbon polymers such as hydroxy-terminated polybutadiene or polyisoprene. These initial precursor polymers (A) may be chain-extended before final formulation by reaction with diisocyanates so as to form chain-extended prepolymers (B), the proportion of diisocyanate and polymer (A) being such that as to leave terminal isocyanate groups, and such that molecular weight is not too high for adequate flowability. Usually the % NCO in the final prepolymer will be about 0.5–15%. A final cross-linking and curing agent such as a polyamino compound is added at this point, along with catalysts, etc. and the composition is cast, flowed, injected, extruded or otherwise formed into the shape of the desired final rubber article, and cured in this shape.

In some cases the chain extension step to form the chain-extended material (B) may be omitted, and appropriate poly-functional isocyanates and curing agents added to the initial polymer (A), which is then formed and cured to form the final article directly by what is termed a one-shot process. The NCO/OH ratio in this process may range from 0.5 to 2.6.

In accordance with this invention, the porous carbon black is added at a point in the process where the composition is still fluid, i.e. it is added to the low molecular weight polymer (A) or the still flowable chain-extended prepolymer (B) before casting or curing. Addition to the low molecular weight polymer (A) is preferred, since fluidity is greater at this point in the process. Preferably, the carbon black is milled or otherwise ground into the low molecular weight polymer. After the carbon black has been added, the mixture is subjected to a vacuum of 20 mm. or less, preferably 0.1–20 mm. of mercury. A very remarkable decrease in viscosity is observed during the vacuum treatment, which decrease persists throughout the further processing of the material and greatly facilitates the final forming manipulations as aforesaid. A certain amount of gases and volatile matter will be observed to be evolved during this treatment. The reduction in viscosity is not immediate, and the vacuum treatment must usually be applied for an hour or more, depending on the character of the precursor, and the type and amount of carbon black. The temperature of treatment should be in the range of 30°–200°C. As to the point at which the carbon black is added to the precursors, this is preferably done at a state where the viscosity is least, e.g. to the active-hydrogen-containing precursor polymers (A) referred to above. However, the carbon black may be added to the chain-extended polymers (B) or at any point farther down the line before curing where the precursors are still fluid enough to permit such incorporation.

With the foregoing discussion in mind, there are given herewith detailed examples of the practice of this invention. All parts and percentages given are by weight, unless otherwise expressly indicated.

EXAMPLE I (A) Vacuum Treatment-Compounding Step
Prepolymer (1)    200g.
Carbon black
(porous or other type,    0 or 60 g.
per Table 1)    (per Table 1)

(1) A prepolymer from "Polymeg 2100", a poly (tetrahydrofuran) produced by Quaker Oats Company having a molecular weight of 2100. The prepolymer is made by reaction with tolylene diisocyanate in a weight ratio of 1:4.15 tolylene diisocyanate:poly(tetrahydrofuran), equivalent ratio 2:1 NCO:OH.

A series of compositions was made up in accordance with the foregoing recipe. In each run, this mixture blended with the prepolymer on a three-roll paint mill. This mixture was then transferred to a three-necked flask provided with a stirrer, a thermometer, and a vacuum and vapor take-off connection, and heated therein with a stirring at a temperature of 70°–120°C. under an absolute pressure of 3mm. of mercury for 16 hours. In the course of this treatment, a very marked decrease in viscosity was observed in the case where a porous-type carbon black was used, i.e., Run No. 1 in Table I below. The mixture was then removed, compounded, and cured as set forth at (B) below.

(B) Compounding and Curing
Mixture prepared according to (A) above    200 g.
Methylene-bis-(ortho chloroaniline)    17.8 g.*
                    (NH$_2$.NCO ratio 1.025

*23.0 grams where no carbon black was used.

The above ingredients were quickly incorporated together at 70°C., stirred under vacuum for 2–4 minutes and then (where possible as indicated by "castable" in Table I) poured into molds. When pouring was impossible (as indicated by "not castable" in Table I), the compositions were trowelled or scooped into the molds. The specimens were cured for 2 hours at 170°C. in a press at 1000 psi. The specimens were de-molded and tested when cool with results as indicated in Table I.

It will be seen that Run No. 1, using the porous black, increases both room temperature and 100°C. properties of the product as compared with Run No. 2, using an ordinary HAF black and as compared with Run No. 4, using no black. The HAF black of Run No. 2 prevents the castability of the product. The properties obtained with Run No. 3, using EPC black are substantially the same as those obtained in Run No. 1, but the composition was not castable.

EXAMPLE II

| Hydroxylated Hydrocarbon Polymer | |
|---|---|
| Liquid Hydroxylated Butadiene/Styrene Copolymer ("CS-15" a product of Atlantic Refinery Company Hydroxyl content .65 milliequivalents/gram) | 100 grams |
| Porous carbon black ("Regal 400 R", same as in Example I) | 20 grams |
| Tolylene diisocyanate | 11.3 grams (NCO:OH = 2:1) |
| Methylene bis-(o-chloroaniline) | 19.8 grams (NH$_2$:NCO = 1.15) |

The liquid copolymer and carbon black were mixed together with a spatula. The rather stiff mass was then subjected to vacuum and stirring as described in Example I. The mixture became readily flowable during the course of this treatment. The tolylene diisocyanate was then added with stirring and allowed to react. The methylene-bis-(o-chloroaniline) was then quickly mixed in and the mixture poured into molds and cured in the molds, removed and tested, with results as given in Table II below.

TABLE I

| Run No. | 1 | 2 | 3 | 4 |
|---|---|---|---|---|
| Carbon Black Used | Porous Black (Note 1) | HAF (Note 2) | EPC | Black Omitted |
| Properties at 25 C. | | | | |
| Shore A hardness | 80 | 78 | 85 | 74 |
| Tensile strength (psi) | 4625 | 2025 | 3250 | 4625 |
| Elongation (%) | 590 | 660 | 360 | 675 |
| Modulus | | | | |
| 5% | 230 | 193 | 312 | 164 |
| 100% | 725 | 600 | 1075 | 500 |
| 200% | 1125 | 800 | — | — |
| 300% | 1775 | 1025 | 2400 | 800 |
| Crescent Tear Strength | 350 | 345 | 340 | 295 |
| Properties at 100 C. | | | | |
| Tensile strength (psi) | 1475 | 350 | 1600 | 1675 |
| Elongation (%) | 420 | 100 | 150 | 820 |
| Modulus | | | | |
| 100% | 625 | 340 | 1355 | 420 |
| 300% | 1100 | — | — | 638 |
| Crescent Tear Strength | 190 | 90 | 175 | 170 |
| Castability | Castable | Not Castable | Not Castable | Castable |

Note (1) "Regal 400 R", manufactured by Cabot Corporation. A medium flow porous-type furnace black designed for pigmenting inks and carbon paper. Acidity, pH 5.5, Volatiles 3.1, Oxygen 1.71%, Carboxyl 0.05 milliequivalents/100 m². Particle size, by electron microscope 25 millimicrons; by nitrogen adsorption 34 millimicrons. Ratio of particle diameters calculated from nitrogen adsorption to particle diameters measured by electron microscope, 1.36. Ratio of adsorption/microscope areas, 1.85.

Note (2) "Elftex 8", manufactured by Cabot Corporation.

EXAMPLE III

One-Shot Process

| | | |
|---|---|---|
| Polycaprolactone ("Niax D 520" a product of Union Carbide Corporation: molecular weight 800) | 1st portion | 135 grams |
| | 2nd portion | 24.5 grams |
| Porous carbon black ("Regal 400 R" as in Example II) | | 30 grams |
| Zinc oxide | | 10.5 grams |

-continued

| One-Shot Process | |
|---|---|
| 2-(hydroxymethyl)-2-methyl-1,3-propanediol | 0.71 grams |
| Methylene bis(phenylene)diisocyanate | 48.6 grams |
| | (NCO:OH = 0.98) |

The first portion of the polycaprolactone and the carbon black were milled together on a three-roll paint mill to form a very stiff dough. The mixture was treated in the apparatus of Example I with mixing at 80°–90°C. under an absolute pressure of 3–5mm. of mercury for 5 hours. The mixture became workably flowable over this time.

The second portion of the polycaprolactone and the zinc oxide were then milled together, the mixture added to the carbon black/polycaprolactone mixture, and the vacuum treatment continued for an additional hour at 80°C. Atmospheric pressure was then admitted, the 2-(hydroxymethyl)-2-methyl-1,3-propanediol mixed in at 80°C., and the methylene bis-(phenylene) diisocyanate added at 60°C. Vacuum was reapplied, the mixture was stirred for 45 seconds, the vacuum was released, and the mixture quickly poured into molds and cured at 150°C. for 2 hours. The properties of the cured products are set forth in Table II below.

EXAMPLE IV

| One Shot--Char Black | |
|---|---|
| Poly (tetrahydrofuran) ("Polymeg 1020" a product of Quaker Oats Company: molecular weight 1020) | 230.6 grams |
| Porous char black (from residue of destructive distillation of discarded tires) | 69.4 grams |
| Dibutyltin dilaurate solution (25% in hexane) | 1 drop |
| Methylene bis-(diphenyl diisocyanate) | 60.5 grams |
| | (NCO:OH = 1.07) |

The poly(tetrahydrofuran) and porous char black were mixed with a spatula and subjected to vacuum treatment at 70°C. and 50mm. of mercury absolute for 18 hours. Again a marked fluidification of the mixture was achieved. The dibutyltin dilaurate solution was mixed in, and the methylene bis-(diphenyl diisocyanate) mixed in under vacuum. The mixture was poured into molds and cured at 150°C. for 3 hours. The properties are given in Table II below.

EXAMPLE V

A. Masterbatch

| | |
|---|---|
| Liquid Hydroxylated Polybutadiene ("R45HT" a product of Atlantic Refinery Company hydroxyl content .77 milliequivalents/gram) | 1000 grams |
| Porous carbon black ("Regal 400 R" as in Example II) | 300 grams |

The above ingredients were milled together on a three-roll mill, and then placed in a flask provided with a stirrer and vacuum offtake. The mixture was stirred at 90°–110°C for 18 hours under 2.5–4.0mm of mercury absolute pressure. There was obtained a readily flowable mixture, hereinafter designated "Masterbatch A".

B. Compounding and Curing

| | |
|---|---|
| Masterbatch A | 100 grams |
| Tolylene diisocyanate | 5.92 grams |

The Masterbatch A was placed in a reaction flask provided with a stirrer and vacuum connections. The mixture was stirred under a pressure of 5mm. of mercury and heated to 78 C., at which time the tolylene diisocyanate was added. Heating and stirring were continued for an additional 2.5 minutes, after which the mixture was poured into molds and cured at 250°C. for 2 hours. The properties are set forth herewith in Table II.

TABLE II

| | EXAMPLE NUMBER | | | |
|---|---|---|---|---|
| | II | III | IV | V |
| Properties at 73 F. | | | | |
| Shore "A" Hardness | 81 | 74 | 75 | 61 |
| Tensile Strength (psi) | 1825 | 3635 | 2700 | 925 |
| Elongation (%) | 220 | 430 | 515 | 260 |
| Modulus at | | | | |
| 5% Elongation | 160 | 53 | 55 | 19 |
| 100% Elongation | 1100 | 325 | 350 | 200 |
| 300% Elongation | — | 1525 | 1125 | — |
| Crescent Tear Strength | 247 | 167 | 160 | 50 |
| Properties at 212 F. | | | | |
| Tensile Strength (psi) | 660 | 900 | 675 | 180 |
| Elongation (%) | 105 | 260 | 260 | 80 |
| Modulus at 100% | | | | |
| Elongation | 650 | 338 | 350 | 200 |
| Crescent Tear Strength | 84 | 92 | 82 | 15 |

EXAMPLE VI

| MISCELLANEOUS POROUS BLACKS | |
|---|---|
| Poly(tetrahydrofuran) ("Polymeg 2000", a product of Quaker Oats Company. Molecular weight, 2000.) | 200 grams |
| Porous or non-porous carbon black (type as specified in Table III) | 40 grams |

A series of formulations were made up in accordance with the above schedule, varying the type of carbon black from run to run as set forth in Table III. In each run, the poly(tetrahydrofuran) and selected carbon black were mixed by hand, and the mixture allowed to stand for several days. The mixture was then heated to 50°C. and milled at room temperature with three passes on a small 3-roll paint mill. The suspension became extremely viscous, on the order of 100,000 cps. The mixture was then placed in an aluminum tray where it shortly became solid, after which it was broken up into small pieces.

A 500 millimeter reaction flask equipped with a stirrer, a thermometer, and a vacuum outlet was provided for the next step in the operation. 100 Grams of the small pieces of the carbon black/poly(tetrahydrofuran) mixture were placed in the flask, which was then heated to 70°C. in an oven, after which the flask was placed in a heating mantle and vacuum applied while stirring. After a certain period of time (usually 2–8 hours) in the case of the porous carbon blacks the mixture was observed to become flowable, at which time it was removed and the viscosity determined on a Brookfield viscosimeter with a spindle No. 4 at 6 rpm. In the case of the non-porous carbon blacks, no such transition to a flowable state was observed. Set forth herewith in Table III are particulars of the several runs.

TABLE III

| Name | Carbon Black Used | | Ratio of A/B | Treatment Conditions | | Viscosity |
|---|---|---|---|---|---|---|
| | Particle Diameter (millimicrons) | | | Time (hrs) | Temp (C.) | cps |
| | A By N₂ Adsorption | B By Electron Microscope | | | | |
| Regal 400 R (1) | 34 | 25 | 1.34 | 8 | 100 | 2800 |
| Regal 330 R (1) | 39 | 25 | 1.56 | 8 | 100 | 8000 |
| Mogul L (1) | 29 | 24 | 1.2 | 2 | 70 | 2500 |
| Vulcan SC (1) | 155 | 176 | .88 | 16 | 100 | not fluid |
| Shawinigan Acetylene Black | 408 | 482 | 1.18 | 16 | 100 | not fluid |

(1) Products of Cabot Corporation

In addition to the viscosity determinations conducted upon the various compositions, samples of each composition were taken before and after the vacuum treatment, and photomicrographs made thereof. These photomicrographs are reproduced in the accompanying drawings, with legends indicating the carbon black used and the treatment history. As discussed above in connection with the drawings, it will be seen that the porous carbon blacks (Regal 400 R, Regal 330 R, and Mogul L) show the phenomenon of growth of particle size during the vacuum treatment, whereas the non-porous carbon blacks (Shawinigan, Acetylene Black and Vulcan SC) did not exhibit this phenomenon.

What is claimed is:

1. The process of making a flowable, castable polyurethane rubber precursor containing carbon black by subjecting a mixture of

| | % based on the weight of Component (A) |
|---|---|
| (A) a flowable, castable polyurethane precursor | 100 |
| and (B) a porous carbon black, said porous black having been subjected to heat treatment at high temperatures in an oxygen-containing atmosphere, resulting in a ratio of diameter of the carbon black particles determined by nitrogen absorption to the diameter of the carbon black as determined by microscopic examination of at least 1.2:1 | 5 – 40 | to a vacuum of 20 mm or less of mercury for a duration of one hour or more at a temperature of 30°–200°C to substantially reduce the viscosity thereof, said precursor composition, when cast and cured, resulting in polyurethane products of improved physical properties reflecting a high degree of reinforcement by the carbon black.

2. Process according to claim 1, wherein the vacuum exposure is carried out at 0.1 to 20 mm of mercury absolute.

3. Process according to claim 1, wherein the carbon black is mixed with a volatile solvent before being incorporated with the urethane rubber precursor.

4. Process according to claim 1 wherein the carbon black is incorporated by milling or grinding.

* * * * *